E. H. FUNK.
Churn Dasher.
No. 82,216. Patented Sept. 15, 1868.
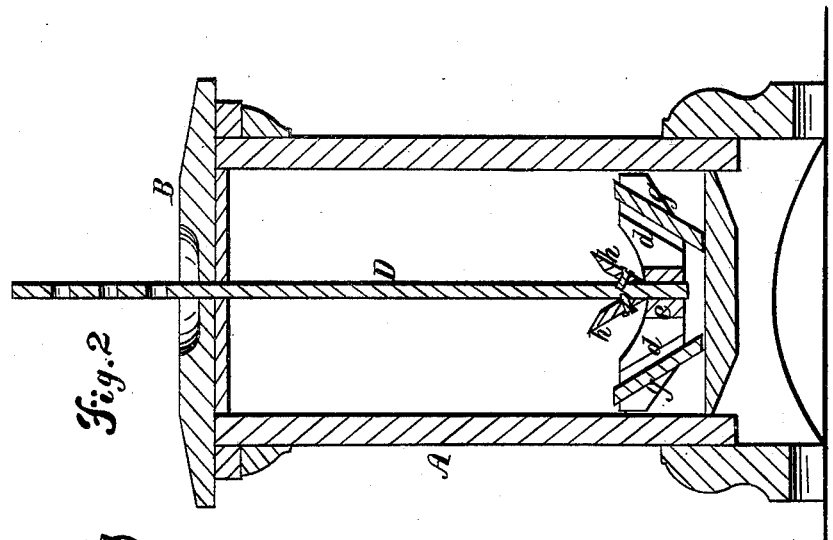
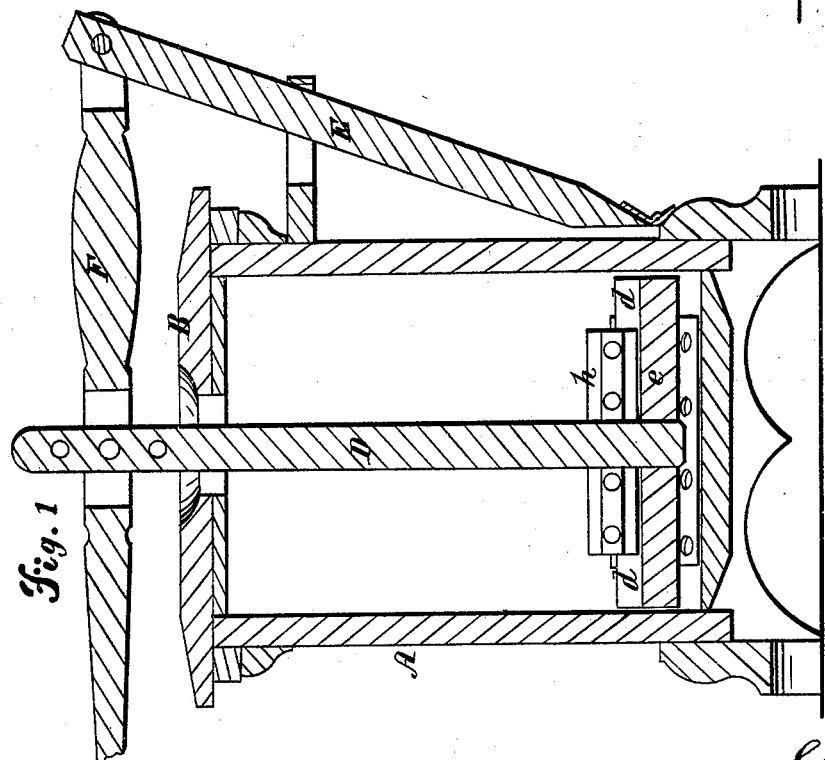

United States Patent Office.

ELLIOT H. FUNK, OF NEWARK, OHIO.

Letters Patent No. 82,216, dated September 15, 1868.

---

IMPROVEMENT IN CHURN-DASHERS.

---

The Schedule referred to in these Letters Patent and making part of the same.

---

TO ALL WHOM IT MAY CONCERN:

Be it known that I, ELLIOT H. FUNK, of Newark, in the county of Licking, and State of Ohio, have invented certain new and useful Improvements in Churn-Dashers; and I do hereby declare that the following is a full, clear, and exact description thereof, reference being had to the accompanying drawings, and to the letters of reference marked thereon, which form a part of this specification, in which—

Figure 1 is a longitudinal section, taken through the line $x$, fig. 2, and

Figure 2 is a vertical cross-section, taken through the line $x$ of fig. 1.

The nature of this invention consists in the employment of pivoted or swinging dasher-boards, operating in connection with breakers, all constructed and arranged substantially as will be hereinafter described.

To enable others to avail themselves of the benefits of my invention, I will now describe its construction and operation.

In the accompanying drawings—

A represents the churn, which may be made in any convenient form, and provided with top B.

D represents the dash-rod, the lower end of which is furnished with the cross-piece $c$. To the ends of this piece are secured the side-pieces $d\ d$.

$g\ g$ are wings or dash-boards, pivoted between the cross-pieces $d\ d$.

It will be observed that the pivots upon which said pieces swing are located near their top or upper side, so that their centre of gravity will incline their lower sides to each other, as shown in fig. 2, the object of which will be presently seen.

$h\ h$ represent two boards, secured to the dash-rod, so that they may incline outwards, as shown in fig. 2.

Both the boards $h\ h$ and dash-boards $g\ g$ are provided with a suitable number of holes.

E represents an arm, the lower end of which is hinged to the churn. The upper end of said arm is pivoted to lever F.

In this lever is a slot, through which the dash-bar extends, and is pivoted therein, as seen in fig. 1.

The object of this lever is to more easily work the dasher.

The operation of my invention is as follows: As the dasher descends, the wings being in the position indicated in fig. 2, the milk will rush through the holes in converging currents until it strikes against the break-boards $h\ h$, which, again violently changing the direction of the currents, breaks the globules most effectually as the dasher ascends. The wings are forced apart by the milk nearly to a vertical position, thus rendering it very light of draught.

What I claim as new, and desire to secure by Letters Patent, is—

The pivoted swinging wings $g\ g$, in combination with the break-boards $h\ h$ and dash-boards $d\ d$, all arranged substantially in the manner and for the purpose set forth.

In testimony that I claim the foregoing as my own, I affix my signature in presence of two witnesses.

E. H. FUNK.

Witnesses:
C. ALEXANDER,
JNO. A. ELLIS.